United States Patent
Van Slooten et al.

(10) Patent No.: US 6,320,318 B1
(45) Date of Patent: Nov. 20, 2001

(54) DISPLAY DEVICE WITH TEMPERATURE STABILIZATION

(75) Inventors: Udo Van Slooten; Herman Schreuders; T. Bisschops, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/486,462
(22) PCT Filed: Jun. 23, 1999
(86) PCT No.: PCT/IB99/01172
§ 371 Date: Feb. 25, 2000
§ 102(e) Date: Feb. 25, 2000
(87) PCT Pub. No.: WO99/67770
PCT Pub. Date: Dec. 29, 1999

(30) Foreign Application Priority Data

Jun. 25, 1998 (EP) .................................................. 98202110

(51) Int. Cl.⁷ .................................................. H05B 39/00
(52) U.S. Cl. ........................... 315/94; 315/112; 315/118; 313/582; 313/584
(58) Field of Search ............................ 315/94, 112, 115, 315/118, 169.4; 313/582, 584, 643

(56) References Cited

U.S. PATENT DOCUMENTS

| | | | |
|---|---|---|---|
| 5,635,111 | * | 6/1997 | Kawano et al. ............... 252/301.6 S |
| 5,747,818 | * | 5/1998 | Cecere ............................ 250/492.21 |
| 5,909,085 | * | 6/1999 | Nelson .................................. 315/94 |
| 6,033,482 | * | 3/2000 | Parkhe ................................. 118/728 |
| 6,080,988 | * | 6/2000 | Ishizuya et al. .................. 250/338.1 |
| 6,169,364 | * | 1/2001 | Van Slooten et al. ............... 313/582 |

FOREIGN PATENT DOCUMENTS 0816898    1/1998    (EP) .

* cited by examiner

*Primary Examiner*—Haissa Philogene

(57) ABSTRACT

The present invention relates to an image display system comprising a display panel (1) having at least one channel (35, 37, 39) comprising an ionizable gas mixture (55) including at least a basic gas and an additional gas. The walls of the channel are provided with electrodes (41, 43) for selectively ionizing the ionizable gas mixture during operation. The display system further comprises means for supplying additional gas to the ionizable gas mixture. The additional gas is a gas of the group formed by deuterium, hydrogen and deuterium hydrogen. The image display system is provided with temperature-stabilizing means for stabilizing the temperature of the means for supplying deuterium, hydrogen or deuterium hydrogen.

11 Claims, 4 Drawing Sheets

DISPLAY DEVICE WITH TEMPERATURE STABILIZATION

BACKGROUND OF THE INVENTION

The invention relates to a display device having a display panel comprising at least one compartment which contains an ionizable gas mixture including at least a basic gas and an additional gas, the compartment being provided with electrodes for selectively ionizing the ionizable gas mixture during operation, and the display panel comprising means for supplying the additional gas to the ionizable gas mixture.

Display devices for displaying monochromatic images or color images comprise plasma-addressed liquid crystal display devices, referred to as PALC displays, preferably of the flat-panel type. PALC displays are used, for example, as displays for television and computer applications.

A display device of the type described in the opening paragraph is known from, for example published European patent application EP 0 816 898. The flat-panel type display device described in this application has a display screen with a pattern of (identical) data storage or display elements and a plurality of compartments. The compartments are filled with an ionizable gas mixture and are provided with electrodes for selectively ionizing the ionizable gas mixture during operation. In the known display device, the compartments have the shape of parallel, elongated channels in the form of a channel plate functioning as selection means for the display device. These are the plasma-addressed row electrodes. By applying a voltage difference across the electrodes in one of the channels of the channel plate, electrons are emitted from the cathode. The electrons will ionize the ionizable gas so that a plasma is formed. When the voltage across the electrodes in one channel is switched off and the gas mixture is deionized, a subsequent channel is switched on. At the display screen side of the display device, the compartments are closed by a relatively thin dielectric layer referred to as the microsheet. This layer is provided with electro-optical material, and further electrodes which function as the data electrodes or column electrodes of the display device. The further electrodes are provided on a substrate. The display panel is constituted by the assembly of the channel plate with the electrodes and the ionizable gas mixture, the dielectric layer, the layer of the electro-optical material and the further electrodes.

In a PALC display panel, the panel is addressed row by row. The resolution is determined by the number of rows which can be written per second. The minimally required time for writing a row is determined by the time required to ignite the plasma, the time required to charge the microsheet and the time required to switch off the plasma, referred to as the afterglow decay time. The shorter the afterglow decay time, the larger the number of rows which can be written per second and the higher the maximally achievable resolution.

A gas mixture which is known to be suitable for a relatively short afterglow decay time is a He-$H_2$ mixture. However, a problem with such a mixture is the stability with respect to time. The quantity of $H_2$ is relatively small (typically less than 3%) and the probability that the equilibrium pressure of $H_2$ in the mixture remains constant is very small. This pressure variation is caused by the loss of hydrogen, for example, due to implantation in the electrodes during operation of the panel, or because there may be hydride formation. At a too low hydrogen pressure, the afterglow decay time will be too long, while the plasma will no longer function optimally at a too high hydrogen pressure. Said European patent application proposes providing the panel with a material which supplies and absorbs hydrogen so as to control the hydrogen pressure in the compartments.

A drawback of this solution is that, for the material used as a hydrogen source, the equilibrium pressure of hydrogen in the material is dependent on the temperature. Since the operating temperature of a PALC display panel may vary between 0° C. and about 80° C., a variation of more than a factor of 100 may occur in the hydrogen pressure, which is not acceptable.

OBJECT AND SUMMARY OF THE INVENTION

It is an object of the present invention to provide a display device in which the hydrogen pressure in the display panel is maintained substantially constant.

To this end, the display device according to the invention is characterized in that the display device is provided with temperature-stabilizing means for stabilizing the temperature of the means for supplying the additional gas.

Since there is a loss of the additional gas, resulting in a reduction of the concentration of the additional gas, and since the afterglow decay time preferably remains below a given value, it is desirable to take measures so as to maintain the partial pressure of the additional gas in the ionizable gas mixture substantially constant. The partial pressure of the additional gas can be controlled by providing the display device with means which supply additional gas. The materials used for this purpose yield a constant partial pressure of the additional gas within a given concentration range of the additional gas. For this given concentration range, this pressure is thus substantially independent of the concentration of the gas in the material, but is dependent on the temperature of the material. By stabilizing the temperature of the material supplying additional gas, said temperature dependence and, consequently, the variation of the partial pressure of the additional gas in the ionizable gas mixture is compensated. In this way, the pressure of the additional gas in the compartments can be maintained at the desired level.

A preferred embodiment of the display device according to the invention is characterized in that the additional gas is a gas of the group constituted by hydrogen, deuterium, or hydrogen deuterium.

Important parameters of the plasma discharge cycle of the display device are the electric conductivity of the plasma discharge and the decrease of conductivity in the afterglow decay time. When the decrease of the conductivity of the plasma discharge progresses too slowly, the discharge may continue while a subsequent data row is already being written, which is undesirable. A conductivity which decreases too rapidly also has detrimental effects.

Helium (He) is the most frequently used basic gas in display devices of the type described in the opening paragraph. The ignition voltage of the plasma discharge may be decreased by adding small quantities of a gas (typically of the order of several percents) to the helium. Such gases generally have an ionization potential which is lower than that of helium. The gas mixtures formed are referred to as Penning mixtures. A known additional gas is hydrogen ($H_2$). By using such gas mixtures, not only the ignition characteristic of the plasma discharge is influenced but also, for example, the current which is necessary to maintain the discharge, and the afterglow decay characteristic of the discharge. The properties of the plasma discharge cycle of the display device can be influenced by making a suitable choice of the additional gas. The additional gas may be alternatively deuterium ($D_2$) or hydrogen deuterium (HD), so that, in comparison with the addition of hydrogen, the plasma discharge will have a lower ignition and sustain voltage and a longer afterglow decay time.

A further embodiment of the display device according to the invention is characterized in that the temperature-stabilizing means comprise a Peltier element accommodating the means for supplying the additional gas.

A Peltier element is a very suitable element with which the means for supplying the additional gas can be both cooled and heated.

A further embodiment of the display device according to the invention, comprising an exhaust tube, is characterized in that the Peltier element is accommodated in the exhaust tube, and in that at least a part of the heat exchanger of the Peltier element forms part of the wall of the exhaust tube.

The exhaust tube has an exhaust connection for the display device. The heat exchanger forms part of the wall of the exhaust tube in order to supply heat to the ambiance or to a heat sink.

Another embodiment of the display device according to the invention is characterized in that the temperature-stabilizing means comprise a wire on which the means for supplying the additional gas are provided, the temperature of said wire being variable.

By passing a current through the wire, the wire will be heated. Since the resistance of the wire is dependent on the temperature, the temperature of the wire can be measured and controlled by measuring the resistance.

A further embodiment of the display device according to the invention, comprising an exhaust tube, is characterized in that the wire is accommodated in the exhaust tube.

A further embodiment of the display device according to the invention is characterized in that the means for supplying the additional gas comprise a material from the group constituted by $VZ_2$, $LZ_3$, $PdZ_{0.6}$, $LaNi_5Z_6$, $LaNi_2Z_x$, $LaCo_5Z_x$, $Zr-Mn-Z_x$ and $Pd-Ag-Z_x$, in which L is a lanthanide and Z is hydrogen and/or deuterium.

The above-mentioned materials are particularly suitable as means for supplying hydrogen, deuterium or hydrogen deuterium. Consequently, they are hydride-forming materials which have a plateau for a given concentration range in the desired pressure range. All of these materials have a relatively flat part in a relatively large concentration range of additional gas in the guest material. Thus, these materials supply a constant partial pressure of the additional gas, which is substantially independent of the concentration of the gas in the guest material and its temperature dependence is compensated in the present invention.

The temperature-stabilizing means mentioned so far are provided internally in the display panel. Another embodiment of the display device according to the invention, comprising a background illumination unit, is characterized in that the background illumination unit forms part of the temperature-stabilizing means.

An alternative embodiment of the display device according to the invention, comprising an exhaust tube, is characterized in that a heating element surrounds the exhaust tube.

The temperature stabilization in this case is also effected by means which are present within the display device but outside the display panel. This solution is relatively simple. The heating element may be, for example a helical heating wire.

These and other aspects of the invention are apparent from and will be elucidated with reference to the embodiments described hereinafter.

Figure 1:
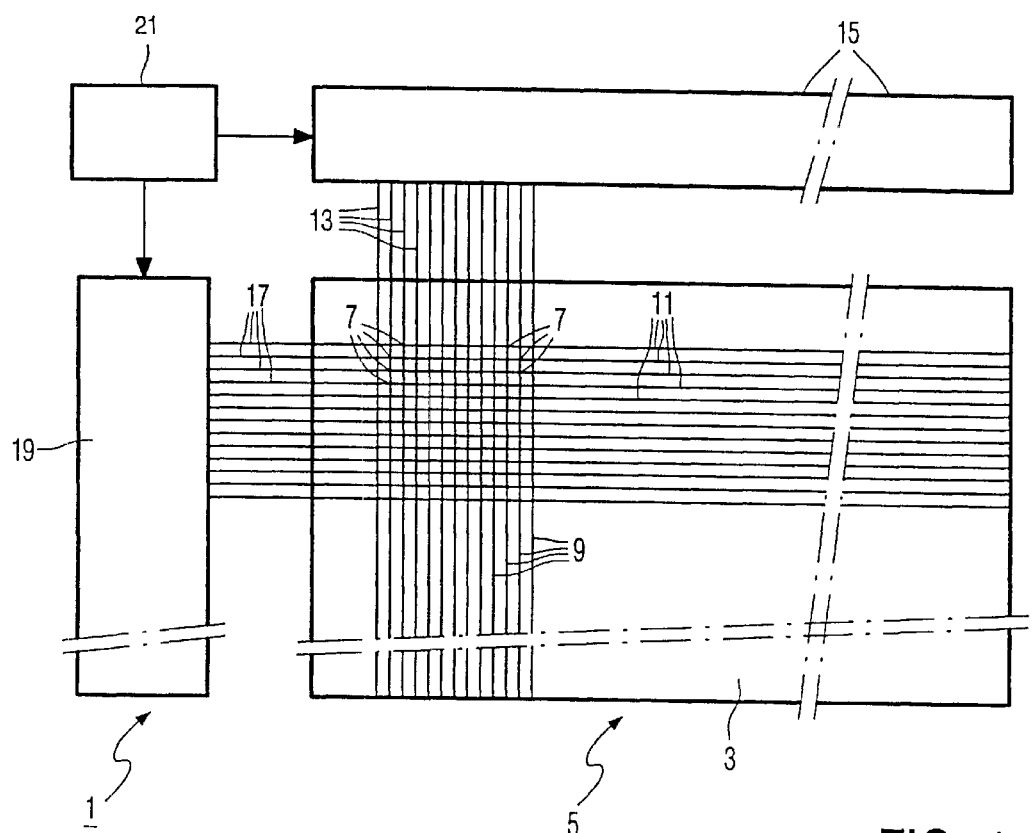
FIG. 1 is a block diagram of a display panel.

FIG. 1 is a block diagram of a conventional image display panel 1 of an image display device. The display panel 1 has a substrate 3 with a surface 5 which is provided with a pattern of pixels 7 which are mutually separated from one another in the vertical and horizontal directions. Each pixel 7 comprises overlapping parts of electrodes 9 which are provided in vertical columns, referred to as the column electrodes, and electrodes 11 which are provided in horizontal rows, referred to as row electrodes. In a plasma-addressed liquid crystal display device (PALC), the rows are constituted by long, narrow channels, referred to as compartments. The pixels 7 in each row of electrodes 11 represent one data row.

The width of the electrodes 9, 11 determines the dimensions of the pixels 7 which are typically rectangular. The electrodes 9 receive data drive signals from a drive circuit 15 via parallel conductors 13, and the electrodes 11 receive data drive signals from a drive circuit 19 via parallel conductors 17.

To realize an image or a data-graphic reproduction on a relevant area of the surface 5 of the substrate 3, the display device uses a control circuit 21 which controls the drive circuits 15 and 19. Various types of electro-optical materials may be used in the display device. Examples of suitable electro-optical materials are twisted nematic or ferro-electric liquid crystalline materials. Generally, the electro-optical materials attenuate the transmitted or reflected light, dependent on the voltage which is applied across the material.

Figure 2:
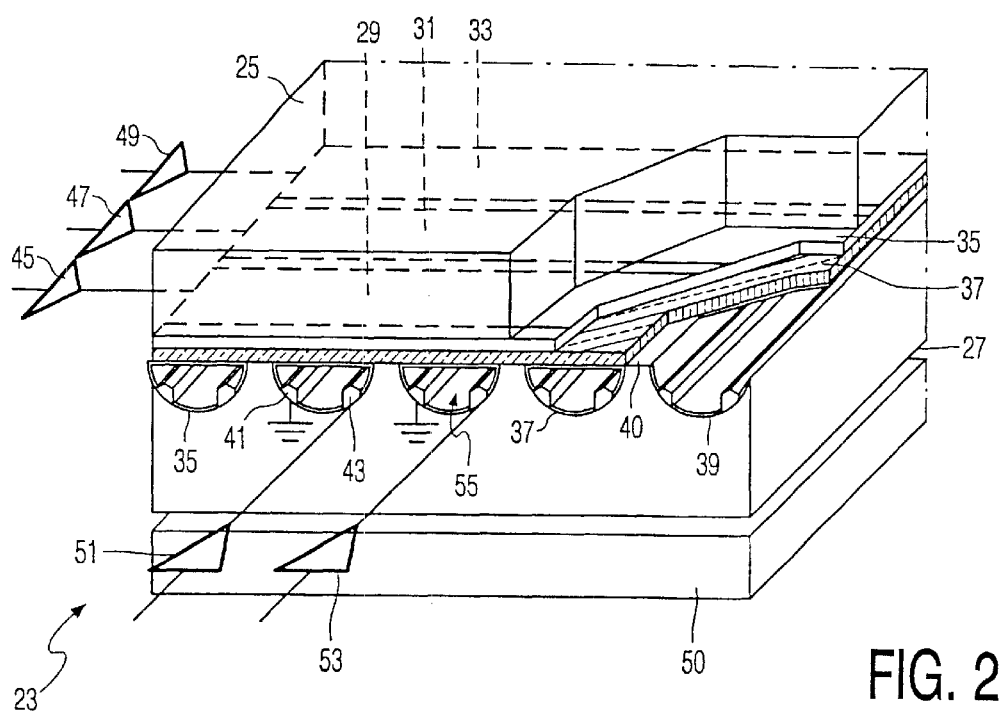
FIG. 2 shows diagrammatically a part of a plasma-addressed liquid crystal display device in a perspective view.

FIG. 2 is a diagrammatic perspective view of a part of a plasma-addressed liquid crystal display device 23. The display device 23 has a first substrate 25 and a second substrate 27. FIG. 2 shows only three column electrodes 29, 31, 33. The row electrodes 35, 37, 39, which function as selection means, are constituted by a plurality of parallel, elongated channels under a layer of electro-optical material. An inner surface of each compartment is provided with first and second elongated electrodes 41, 43 which extend throughout the length of the channel. The second electrode 43 is referred to as the anode and is fed with a pulsed voltage referred to as strobe pulse, at which electrons emitted from the cathode 41 ionize the gas while forming a plasma. In an alternative embodiment, the cathode is fed with a negative (DC) pulse. Only when the strobe pulse has ended and the gas is deionized is the next channel switched on. To reduce the cycle time, the next channel is usually already ionized before the previous channel has been (completely) deionized. Since the column electrodes 29, 31, 33 each cross an entire column of pixels, only one plasma row connection per unit of time is possible so as to avoid crosstalk. The panel is provided with electric connections to the column electrodes 29, 31, 33 and to the plasma electrodes 41, 43, the column electrodes 29, 31, 33 receiving drive signals from output amplifiers 45, 47, 49, and the anode electrodes 43 in the channels 35, 37, 39 receiving drive signals from output amplifiers 51, 53. Each channel 35, 37, 39 is filled with an ionizable gas 55 and is sealed by a thin dielectric layer 57, referred to as the microsheet, which consists of, for example glass.

The ionizable gas mixture comprises a basic gas to which an additional gas is added. In such display devices, helium (He) is usually used as a basic gas for the ionizable gas mixture 55. Also nitrogen ($N_2$) or rare gases such as, for example xenon (Xe), krypton (Kr) and neon (Ne) may be used as a basic gas. The ignition voltage of the plasma discharge may be decreased by adding a given quantity of an additional gas (typically of the order of 0.1 to 3%) to the basic gas. A known gas which is added to the basic gas so as to form Penning mixtures is hydrogen ($H_2$). The properties of the plasma discharge are influenced by using such gas mixtures. Instead of hydrogen, it is alternatively possible to add deuterium or hydrogen deuterium, so that, in comparison with the addition of hydrogen, the plasma discharge may have a lower ignition and sustain voltage and a longer afterglow decay time.

Due to the loss of additional gas, the partial pressure of this gas in the mixture will not remain constant. To this end, the panel is provided with means which are capable of supplying the additional gas and compensate in this way for this loss and thus control the partial pressure of this gas in the gas mixture. Materials which are suitable for this purpose, also referred to as guest materials, supply a constant partial pressure of the additional gas within a given concentration range.

Figure 3:
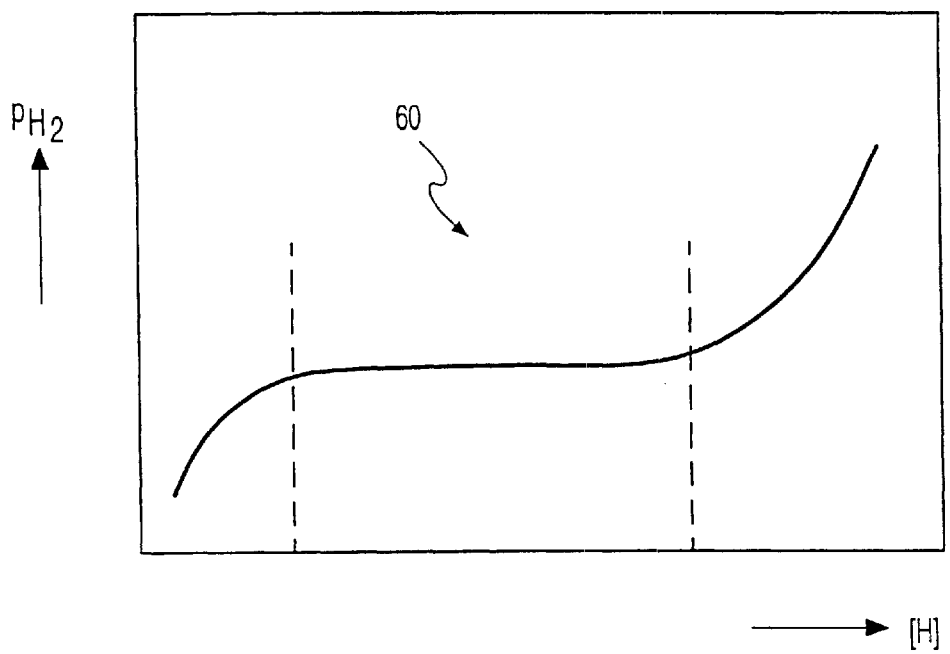
FIG. 3 shows the pressure of hydrogen as a function of the hydrogen concentration in the guest material.

FIG. 3 shows diagrammatically the partial pressure of hydrogen as a function of the hydrogen concentration in the guest material. The central part of the curve has a plateau 60. In that part of the curve, the partial pressure of the additional gas is substantially independent of the concentration of the additional gas in the guest material. Moreover, it is desirable for the level of the plateau to be in conformity with the partial pressure of hydrogen desired in the display device.

It is known that the addition of a given quantity of the above-mentioned additional gases to a basic gas does not only influence the ignition and sustain voltage of the plasma discharge, but such additional gases generally also have a detrimental influence on the afterglow decay time T of the plasma discharge. The afterglow decay time is herein understood to mean the time in which the conductivity of the plasma has decreased by a factor of 1/e. The afterglow decay time is mainly determined by the presence of metastable particles and their decay. Measurements have proved that additions of $H_2$, $D_2$ and/or HD have the greatest influence on the afterglow decay time of the plasma, which is caused by the Penning reactions at which metastable particles are quenched.

When the pressure of the ionizable gas mixture in a PALC display panel is approximately 20 kPa, the partial pressure p of the additional gas is approximately 0.4 kPa. The formation heat ΔH of the desired material can be calculated by means of the Van't Hof equation:

$$\ln p(H_2) = \frac{\Delta H}{RT} - \frac{\Delta S}{R}$$

$$\Delta H = RT \ln p(H_2) + T\Delta S$$

in which R is the gas constant (R=8.3 J/mol K), T is the temperature (in K) and ΔS is the entropy change for absorption of the additional gas (ΔS≈−130 J/mol K for $H_2$). At a temperature of T=293 K and p=0.4 kPa, a value of the formation heat of ΔH≈−52 J/mol is thus obtained for $H_2$. All hydride-forming materials having a plateau in the desired pressure range are suitable as means for dispensing $H_2$, $D_2$ or HD and/or for regulating the pressure of the $H_2$, $D_2$ or HD. Examples of suitable hydride-forming materials are $VH_2$, $LH_3$, $PdH_{0.6}$, $LaNi_5H_6$, $LaNi_2H_x$, $LaCo_5H_x$, $Zr-Mn-H_x$ or $Pd-Ag-H_x$, in which $LH_3$ is a lanthanum hydride (for example, $LaH_3$ or $CeH_3$) and in which one or more of the hydrogen atoms may be replaced by deuterium. For example: $VH_2$ has a formation heat ΔH≈−54 J/mol, which corresponds under the given circumstances to a partial pressure $p(H_2)$ 0.15 kPa. $PdH_{0.6}$ has a $p(H_2)$≈0.3 kPa. The plateaus of $LaNi_5H_6$, $LaNi_2H_x$ are above $p(H_2)$>0.1 kPa and, for $LaCo_5H_x$, the partial hydrogen pressure under the given circumstances is $p(H_2)$≈0.4 kPa. By forming compounds of, for example the type $LaNi_{5-x}Co_x$, the pressure in the display device can be adjusted at the desired level.

In the known display devices, the means supplying deuterium, hydrogen or hydrogen deuterium are provided in, for example a space which is also referred to as exhaust tube, or exhaust box, which comprises the exhaust connection of the display device. The means may have the shape of, for example a pellet, a wire, a foil or a powder. Since this exhaust tube communicates with the compartment or the compartments of the display panel, the partial pressure of the additional gas in each compartment is controlled. Instead of in the exhaust tube, the means may be alternatively provided in the compartment or the compartments. In that case, the guest material may form part of the electrodes, or the electrodes may be provided with a layer of the guest material.

Figure 4:
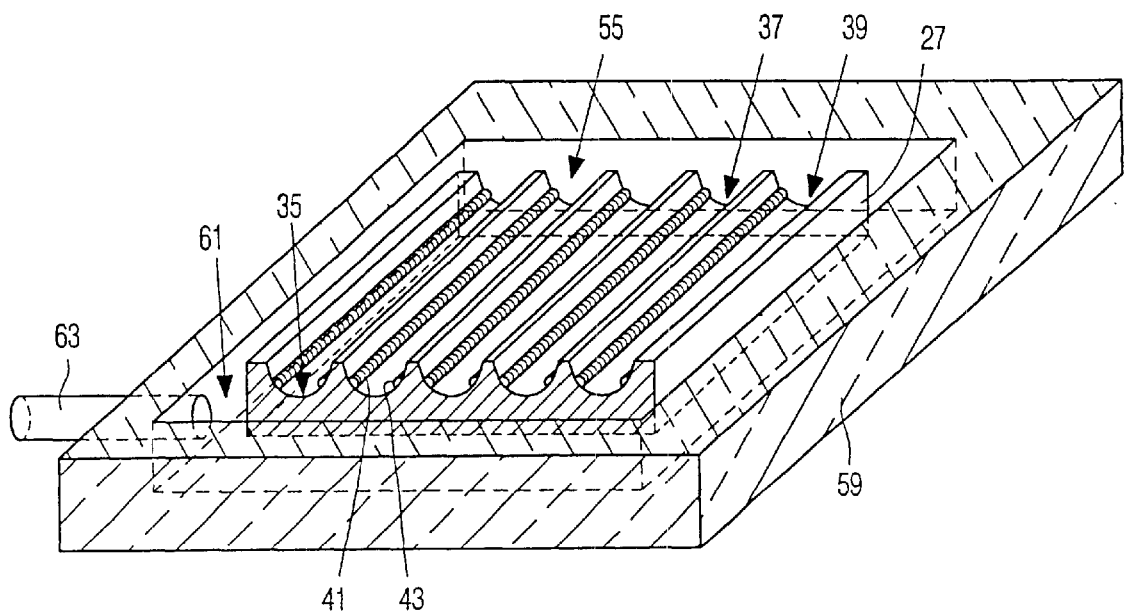
FIG. 4 shows diagrammatically a part of a plasma-addressed liquid crystal display device in a perspective view.

FIG. 4 shows a part of the display device of FIG. 2, showing only the second substrate 27. The first substrate, the microsheet, the electro-optical layer, the column and row electrodes and the output amplifiers, etc. have been omitted for the sake of clarity. Components which are common to those in FIGS. 2 and 4 have the same reference numerals in both Figures. In the example of FIG. 4, the channel plate 27 is accommodated in a recess of a further substrate 59. The channel plate 27 and the further substrate 59 may also constitute a solid part. The ionizable gas mixture 55 is present in the channels 35, 37, 39 of the channel plate 27. The further substrate 59 has a recess or chute 61 surrounding the channel plate 27, realizing a homogeneous gas distribution in the display device. For filling the display device with the desired ionizable gas mixture and for giving the display device the desired pressure after the microsheet has been placed on the channel plate 27, the display device is provided with an exhaust box or exhaust tube 63. The exhaust tube 63 is thus connected to the plate 64 of the panel accommodating the compartments.

The means regulating the pressure of the additional gas, for example hydrogen, deuterium or hydrogen deuterium may be provided, for example in the recess or chute 61 in this case.

The present invention proposes several ways in which the temperature of the means supplying the additional gas can be stabilized so that the hydrogen pressure in the display panel remains substantially constant. In fact, for the material which is used as a guest material, the partial pressure of hydrogen is dependent on the temperature, and this is undesirable.

Figure 5:
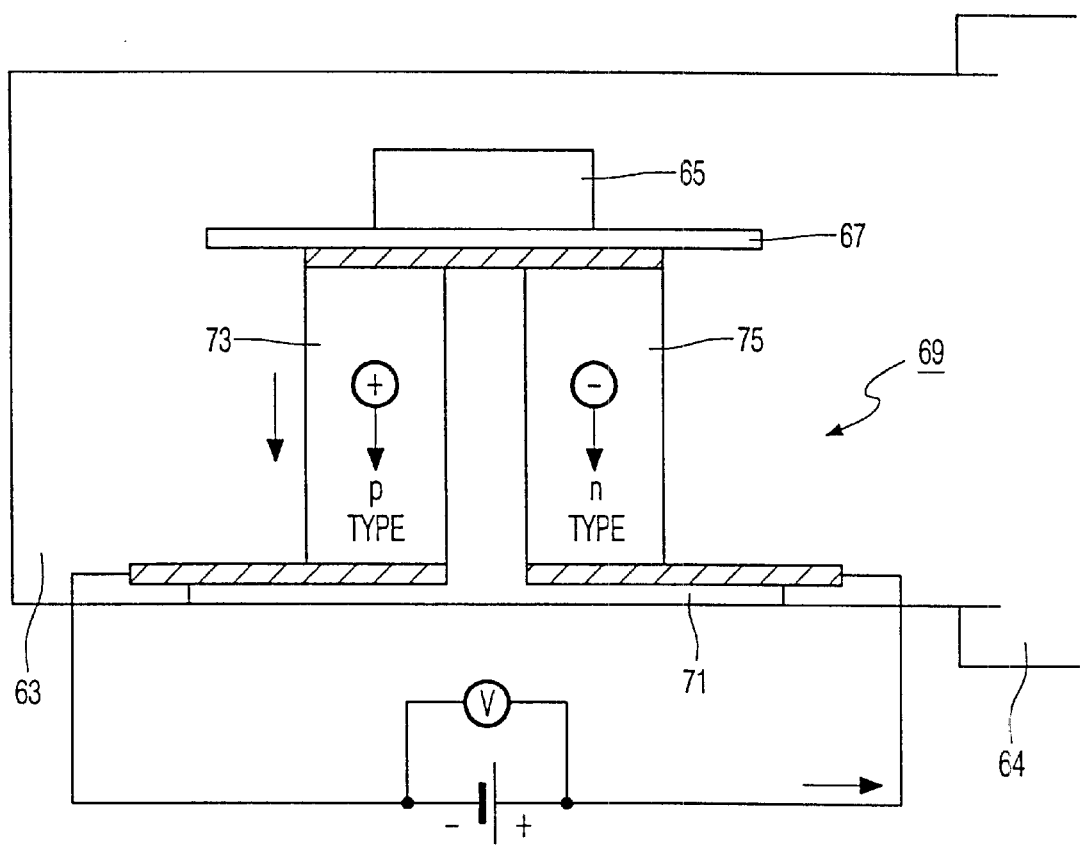
FIG. 5 shows the integration of a Peltier element with the guest material in the exhaust tube.

In a first possible implementation, it is proposed that the means for supplying the additional gas are provided on a Peltier element which is integrated in the exhaust tube 63. An embodiment is shown in FIG. 5. The guest material, in this example in the form of a pellet, is present on the first ceramic plate 67 of a Peltier element 69. A p-type material 73 and an n-type material 75 are present between the first ceramic plate 67 and a second ceramic plate 71. These materials are electrically connected in series and thermally in parallel. Dependent on the supplied current, the temperature of the guest material can be raised or lowered by means of a Peltier element, so that the partial pressure of the additional gas in the display panel can be maintained constant. The outer side of the Peltier element 65, in other words the heat exchanger, is part of the outer side of the exhaust tube 63 so that heat can be supplied to the ambience or to a heat sink (not shown).

Figure 6:
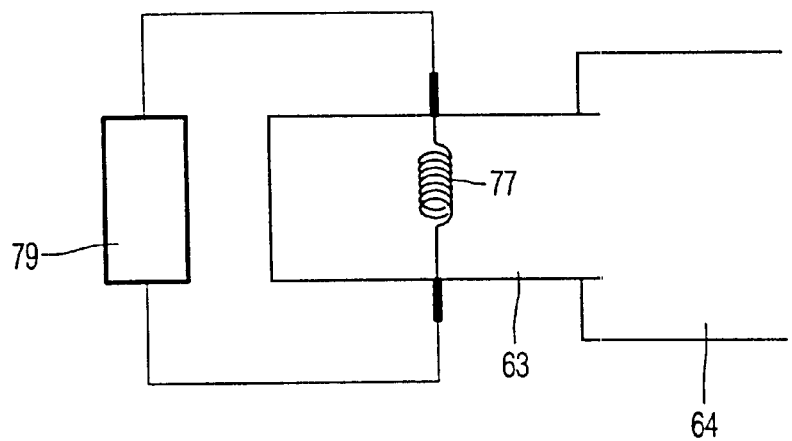
FIG. 6 shows the integration of a wire provided with the guest material in the exhaust tube.

In a second possible implementation, it is proposed that a guest material is provided on a wire, for example a metal wire which is brought to a suitable temperature. Since the resistance of the wire is dependent on the temperature, the temperature can be measured and controlled by measuring the resistance. The wire is present in, for example the exhaust tube 63. An embodiment is shown in FIG. 6. The helically shaped wire 77 is present in the exhaust tube 63 and is connected to a supply unit which is combined with a thermometer. The temperature measurement may be effected, for example by means of a measurement of the electrical resistance of the wire.

The temperature-stabilizing means do not need to be present within the panel but may be alternatively present outside the panel in the display device. The means may comprise, for example the background illumination system of the display device. The background illumination system 50 is shown in the embodiment of the display device of FIG. 2. The display panel is illuminated substantially throughout its surface. The illumination system 50 may comprise a meander-shaped lamp but may alternatively comprise a number of separate lamps. The illumination system supplies such a heat that, in combination with the suitable choice as a guest material, the desired partial pressure of the additional gas can be realized. A suitable material is understood to mean a material which has a relatively flat plateau of partial pressure of the additional gas within a given concentration range of additional gas in the guest material. This embodiment is notably suitable in those cases where the guest material is present in the compartments of the display panel or in the recess 61 (FIG. 4).

Figure 7:
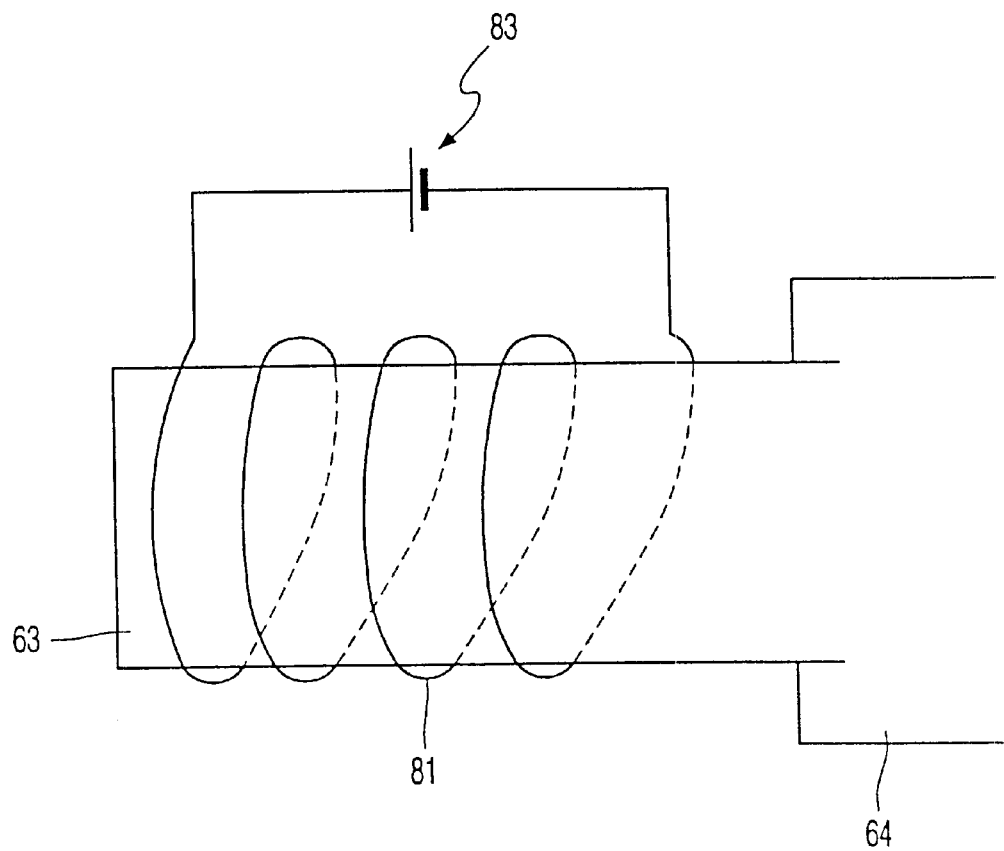
FIG. 7 shows the exhaust tube provided with an external heating element.

Another possibility of temperature stabilization in the case where the guest material is present in the exhaust tube is to provide the exhaust tube 63 externally with a heating element 81. The heating element may be, for example a helical heating wire which can be brought to a given temperature by means of a current source 83. An embodiment is shown in FIG. 7.

Still another possibility of temperature stabilization consists of providing the means for supplying the additional gas internally with a heating element. This can be achieved by using a pellet-like, additional gas supplying means through which a wire extends, said wire having a variable temperature.

What is claimed is:

1. A display device having a display panel comprising at least one compartment which contains an ionizable gas mixture including at least a basic gas and an additional gas, the compartment being provided with electrodes for selectively ionizing the ionizable gas mixture during operation, and the display panel comprising means for supplying the additional gas to the ionizable gas mixture, characterized in that the display device is provided with temperature-stabilizing means for stabilizing the temperature of the means for supplying the additional gas.

2. A display device as claimed in claim 1, characterized in that the additional gas is a gas of the group constituted by hydrogen, deuterium, or hydrogen deuterium.

3. A display device as claimed in claim 1, characterized in that the temperature-stabilizing means comprise a Peltier element accommodating the means for supplying the additional gas.

4. A display device as claimed in claim 3, comprising an exhaust tube, characterized in that the Peltier element is accommodated in the exhaust tube and in that at least a part of the heat exchanger of the Peltier element forms part of the wall of the exhaust tube.

5. A display device as claimed in claim 1, characterized in that the temperature-stabilizing means comprise a wire on which the means for supplying the additional gas are provided, the temperature of said wire being variable.

6. A display device as claimed in claim 5, comprising an exhaust tube, characterized in that the wire is accommodated in the exhaust tube.

7. A display device as claimed in claim 2, characterized in that the means for supplying the additional gas comprise a material of the group constituted by $VZ_2$, $LZ_3$, $PdZ_{0.6}$, $LaNi_5Z_6$, $LaNi_2Z_x$, $LaCo_5Z_x$, $Zr\text{-}Mn\text{-}Z_x$ and $Pd\text{-}Ag\text{-}Z_x$, in which L is a lanthanide and Z is hydrogen and/or deuterium.

8. A display device as claimed in claim 1, comprising a background illumination unit, characterized in that the background illumination unit forms part of the temperature-stabilizing means.

9. A display device as claimed in claim 1, comprising an exhaust tube, characterized in that a heating element surrounds the exhaust tube.

10. A display device as claimed in claim 1, characterized in that the means for supplying the additional gas are internally provided with the temperature-stabilizing means.

11. A display device as claimed in claim 10, characterized in that the means for supplying the additional gas is pellet-like and the temperature-stabilizing means comprise a wire which extends through the pellet-like means for heating these means.

* * * * *